United States Patent
Yagawa

(10) Patent No.: US 7,165,158 B1
(45) Date of Patent: Jan. 16, 2007

(54) SYSTEM AND METHOD FOR MIGRATING A REPLICATION SYSTEM

(75) Inventor: Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/205,024

(22) Filed: Aug. 17, 2005

(51) Int. Cl.
*G06F 12/08* (2006.01)

(52) U.S. Cl. .................. 711/165; 711/114

(58) Field of Classification Search .............. None
See application file for complete search history.

(56) References Cited

U.S. PATENT DOCUMENTS

| | | | |
|---|---|---|---|
| 4,310,883 A | 1/1982 | Clifton et al. | |
| 6,098,129 A | 8/2000 | Fukuzawa et al. | |
| 6,912,629 B1 | 6/2005 | West et al. | |
| 2003/0221077 A1 | 11/2003 | Ohno et al. | |
| 2004/0230859 A1 | 11/2004 | Cochran et al. | |
| 2004/0254962 A1 | 12/2004 | Kodama et al. | |
| 2005/0114410 A1 | 5/2005 | Fujibayashi | |
| 2005/0125618 A1* | 6/2005 | Arakawa et al. | 711/162 |
| 2005/0268055 A1* | 12/2005 | Nonaka et al. | 711/162 |
| 2005/0289310 A1* | 12/2005 | Miki | 711/162 |
| 2006/0010300 A1* | 1/2006 | Arakawa et al. | 711/162 |
| 2006/0090048 A1* | 4/2006 | Okumoto et al. | 711/162 |
| 2006/0090050 A1* | 4/2006 | Zohar et al. | 711/162 |

OTHER PUBLICATIONS

Warrick, Cathy et al., "IBM TotalStorage Enterprise Storage Server: Implementing ESS Copy Services with IBM eServer zSeries", IBM Redbooks, Fifth Ed., IBM Corp., Jul. 2004 pp. i-xi, 13-22, 112-113, 122, 148, 214-215, 250, and 425-427.

* cited by examiner

*Primary Examiner*—Reginald Bragdon
*Assistant Examiner*—Daniel Ko
(74) *Attorney, Agent, or Firm*—Mattingly, Stanger, Malur & Brundidge, P.C.

(57) ABSTRACT

A virtualization system is introduced between a host and a storage system. An apparatus, system, and method of migrating replication includes stopping or making dormant applications on a host, or checking whether the applications are stopped or dormant. The statuses of a primary volume and a secondary volume that is a replica of the primary volume are checked to determine whether they have become identical. A primary virtual volume is defined to map to the primary volume and a secondary virtual volume is defined to map to the secondary volume. Replication is defined from the primary virtual volume to the secondary virtual volume. Replication is started with a NOCOPY option, and the applications may be restarted or a message is sent indicating that the applications can be restarted. There is no actual migration of application data, and as result, the time required for migrating replication can be eliminated.

20 Claims, 12 Drawing Sheets

SYSTEM AND METHOD FOR MIGRATING A REPLICATION SYSTEM

BACKGROUND OF THE INVENTION

1. Field of the Invention

This invention is related to a data replication system including storages and, in particular, to a method for migrating the replication system whereby downtime of applications during the migration and cost of migration are reduced.

2. Description of the Related Art

Storage-Based Replication System

A storage-based replication system is a system that utilizes storage-based replication functions for remote replication and/or in-system replication. The details of remote replication and in-system replication are discussed below.

Remote Replication

Storage-based remote replication is a function in a storage system to replicate data, such as one or more entire volumes, from a production site or a primary site to a remote site or a secondary site while maintaining data integrity. The replicated data is usually called a "replica" or mirror. The technology is used for Disaster Recovery (DR), and the like, in case of failure of the primary storage system. In the event of such a failure, users can recover at least production data from the replicated data at the remote site when the production site happens to be corrupted or inoperative due to a disaster, or the like. Examples of storage-based remote replication systems are Hitachi TrueCopy™, EMC SRDF™, and IBM Peer to Peer Remote Copy (PPRC). Remote replication is also called remote mirroring or remote copy.

In-System Replication

Storage-based in-system replication is a function in a storage system to replicate data or a volume within the storage system. The replicated data will then be backed up to tape or other suitable media to protect against any data loss. Examples of the storage-based in-system replication are Hitachi ShadowImage™, QuickShadow™, EMC TimeFinder, BCV, and IBM FlashCopy™. In this disclosure, "replication" means a function or a system using a replication function, depending on the context of use.

Migrating Replication

It is sometimes necessary for users to migrate their storage system. For example, when a vendor introduces a new storage system, the users may want to update their existing storage system to the new system. In this case, data in the existing storage system needs to be migrated to the new storage system, and applications need to be stopped during the migration. Additionally, if the existing storage system is configured to execute replication, the users will usually want to migrate the replication system as well. Thus, there are at least two issues of concern: first, applications using the existing storage need to be stopped during the migration; and second, migrating replication adds complexity and requires a higher labor cost because the replica and its environment must also be migrated.

With respect to the stoppage of applications, any applications using the storages need to be stopped during the migration so as to prevent data loss and maintain data consistency. However, it is now common for some users to run their business applications continuously (i.e., 24 hours a day, 7 days a week), and their businesses are dependent upon the applications being able to run. Stopping the applications usually results in lost business or productivity. Therefore, these users prefer to reduce or eliminate the time for stopping applications as much as possible so that downtime, lost income, and lost productivity are minimized.

Further, with respect to the second issue, migrating replication requires an additional labor cost and adds complexity to the data migration process. Migrating replication data requires migrating both the replica and its environment, such as replication configuration. Accordingly, the present invention aims to reduce not only cost but also the complexity associated with migrating replication data and configurations.

Virtualization

Recently, virtualization has become a popular technology in the storage industry. The SNIA (Storage Networking Industry Association) defines "virtualization" as "the act of integrating one or more (back end) services or functions with additional (front end) functionality for the purpose of providing useful abstractions. Typically virtualization hides some of the back end complexity, or adds or integrates new functionality with existing back end services. Examples of virtualization are the aggregation of multiple instances of a service into one virtualized service, or to add security to an otherwise insecure service. Virtualization can be nested or applied to multiple layers of a system." (See, SNIA webpage: http://www.snia.org/education/dictionary/v/) In this disclosure, the term "virtualization" is used to mean a technology, function or system using virtualization technology, and also depends upon the context in which it is used.

A virtualization system is a system incorporating virtualization technology. Examples of virtualization systems are Hitachi USP (Universal Storage Platform) whose virtualization function is called as Universal Volume Manager, IBM SVC (SAN Volume Controller), EMC Invista™ (formerly Storage Router), CISCO MDS, and the like. Also, it should be noted that some virtualization systems themselves, such as Hitachi USP, combine the storage system with virtualization.

Prior art storage systems are exemplified by U.S. Pat. No. 6,098,129 to Fukuzawa et al., and U.S. Published Patent Application No. 20030221077 to Ohno et al., the disclosures of which are incorporated by reference herein in their entireties. Additionally, some products include data migration services, replication implementation services and/or replication management software. Some examples of these products are listed in the following web sites:

- http://www.hds.com/products_services/services/product-based/
- http://www.hds.com/products_services/services/storage-_solution/
- http://www.emc.com/global_services/catalog/business_implementation.jsp Co-pending U.S. application Ser. No. 10/788,390, filed Mar. 1, 2004, by Akira Fujibayashi, is directed to a method and apparatus for performing data migration in storage systems implementing a remote copy function and virtualizing storage of existing storage devices in a new storage system after migrating the existing storage data to the new storage devices. When a new storage system is connected to an old storage system destined for replacement and prior to starting data migration, remote copy configuration information from the old storage system is migrated to the new storage system. This allows either the new storage system or the old storage system, depending on the configuration, to maintain an operational remote copy function with a remote storage system during the data migration. Thereafter, data is migrated from the old storage system as a virtual volume to the new storage system while data is being transferred between the new storage system and the remote storage system in accordance with the remote copy configuration information. U.S. application Ser. No. 10/788,390 is hereby incorporated by reference in its entirety.

SUMMARY OF THE INVENTION

An object of the present invention is to solve the issues mentioned previously with respect to migrating replication by using virtualization. Another object of the present invention is to provide a method to update or transform a first system that does not use virtualization to a second system that incorporates virtualization for replication, while minimizing application downtime and reducing the associated cost and downtime of the computer system. Yet another object of the present invention is to permit returning from the second system to the first system if a customer is unhappy with the second system.

The present invention includes a replication migrator, which may be embodied as a software program existing on a host and outside of a storage system. Thus in a preferred embodiment, the present invention may be implemented as management software or script. The software may be initially located in storage, memory or other computer-readable medium. The present invention does not require any hardware modifications or improvement to the storage system, and thus can be implemented with low cost.

When executed, the replication migrator first stops or makes dormant applications using the storage system, or checks whether the applications are stopped or sufficiently dormant, such that data is not being written to the storage system by the applications. Then the invention determines if a primary volume (PVOL) and secondary volume (SVOL) on the existing storage systems are identical or in synch. If so, PVOL and SVOL are de-linked and a primary virtual volume (PVVOL) is defined to map to PVOL, and a secondary virtual volume (SVVOL) is defined to map to SVOL. Then a new replication pair is established between PVVOL and SVVOL and replication is started with a NOCOPY option. (Under the NOCOPY option, the only data that is generally copied to the target is the data that has been changed or overlaid by an application.) Finally, the applications can be restarted or a message can be sent indicating that they can be restarted.

Thus, while the storage system architecture is reconfigured, there is no real application data migration associated with the system and method according to the present invention. As result, the method does not require any time for migrating replication data. In addition, the method uses information of the existing replication configuration to automatically define mapping and replication on the virtualization system, and as a result, the system and method can minimize migration complexity and cost, when migration is actually required.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

DETAILED DESCRIPTION OF THE INVENTION

Figure 1:
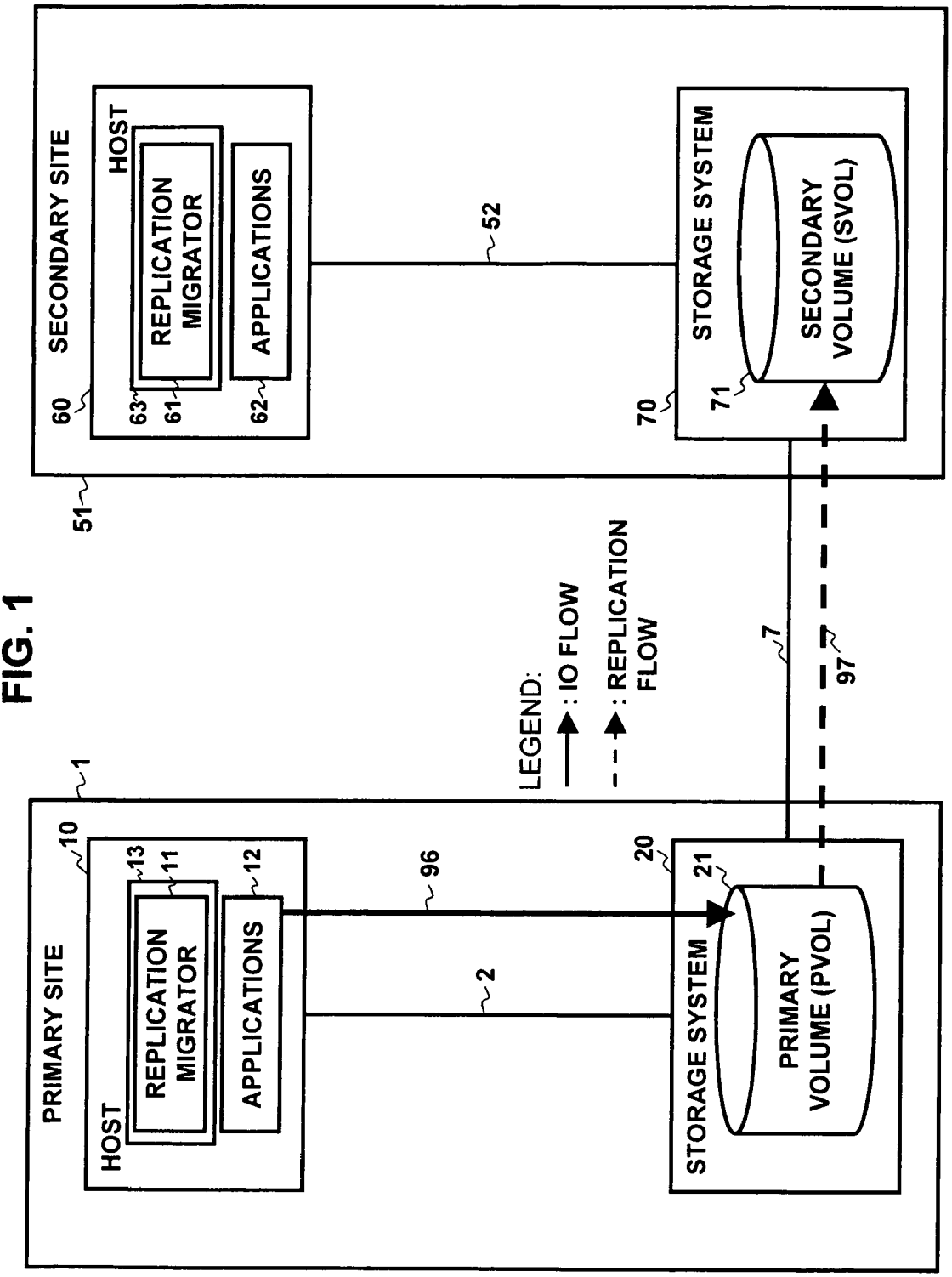
FIG. 1 illustrates a system architecture of a remote replication system to which the present invention is applied prior to virtualization.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views.

First Embodiment

Migrating Remote Replication

FIG. 1 shows a system architecture of a remote replication system to which the present invention is applied, prior to implementation of virtualization. The overall system consists of a primary site 1 and a remote site or secondary site 51. The primary site 1 contains a host 10 and a storage system 20. Of course, several hosts can share several storage systems within a primary site (although not specifically shown here). Secondary site 51 also contains a host 60 and a remote storage system 70.

The host 10 includes applications 12 running on host 10, which issue I/O requests to storages in storage system 20 through an operating system. The Host 10 may also include High Availability (HA) software (not shown in FIG. 1) that watches heart beats between the primary host 10 and the remote host 60 and executes failover or failback operations when they are necessary.

The storage system 20 is a storage system that has remote copy capability. Examples of such storage systems are Hitachi TagmaStore™ Universal Storage Platform, Hitachi Lightning 9900™ V Series and Hitachi Thunder 9500™ V Series. Also, examples of the remote copy product are Hitachi TrueCopy™ and Hitachi Universal Replicator. Storage system 20 includes one or more primary volumes (PVOL) 21 (logical volume) realized on the physical storage devices of the storage system 20, which store data from the host 10 and applications 12. Data in each PVOL 21 is replicated to a secondary volume (SVOL) 71 in secondary storage system 70.

A network 2 between the host 10 and the storage system 20 is a storage network. Examples of the storage network 2 are SAN (Storage Area Network) based on Fibre Channel, iSCSI, FICON, ESCON, etc., and NAS (Network Attached Storage) based on NFS, CIFS, and the like. Secondary site 51 includes a similar network 52 between host 60 and storage system 70.

Generally speaking, secondary site 51 is configured to have a similar architecture as primary site 1. The host 60 and storage system 70 logically act as standby systems to host 10 and storage system 20, respectively, and may also physically function for other purposes, and include applications 62 which may be the same as applications 12 on host 10, or may be different. Alternatively, there may be a configuration that does not include the host 60. In this case, the host 60 may be prepared on demand (in case of a planned or unplanned outage at the Primary Site), and the workload is failed-over to the remote site 51.

A network 7 between primary storage system 20 and remote storage system 70 is a wide area storage network. Examples of such physical networks are Dark Fibers, DWDM, ATM, SONET, etc., and examples of the network protocol are Fibre Channel, FICON, ESCON, FCIP, iFCP, iSCSI, and the like. The network may include extenders that expand network protocols for long distances. An arrow 96 indicates I/O flow from host 10 to storage system 20. An arrow 97 indicates remote replication flow from storage system 20 to storage system 70.

Figure 2:
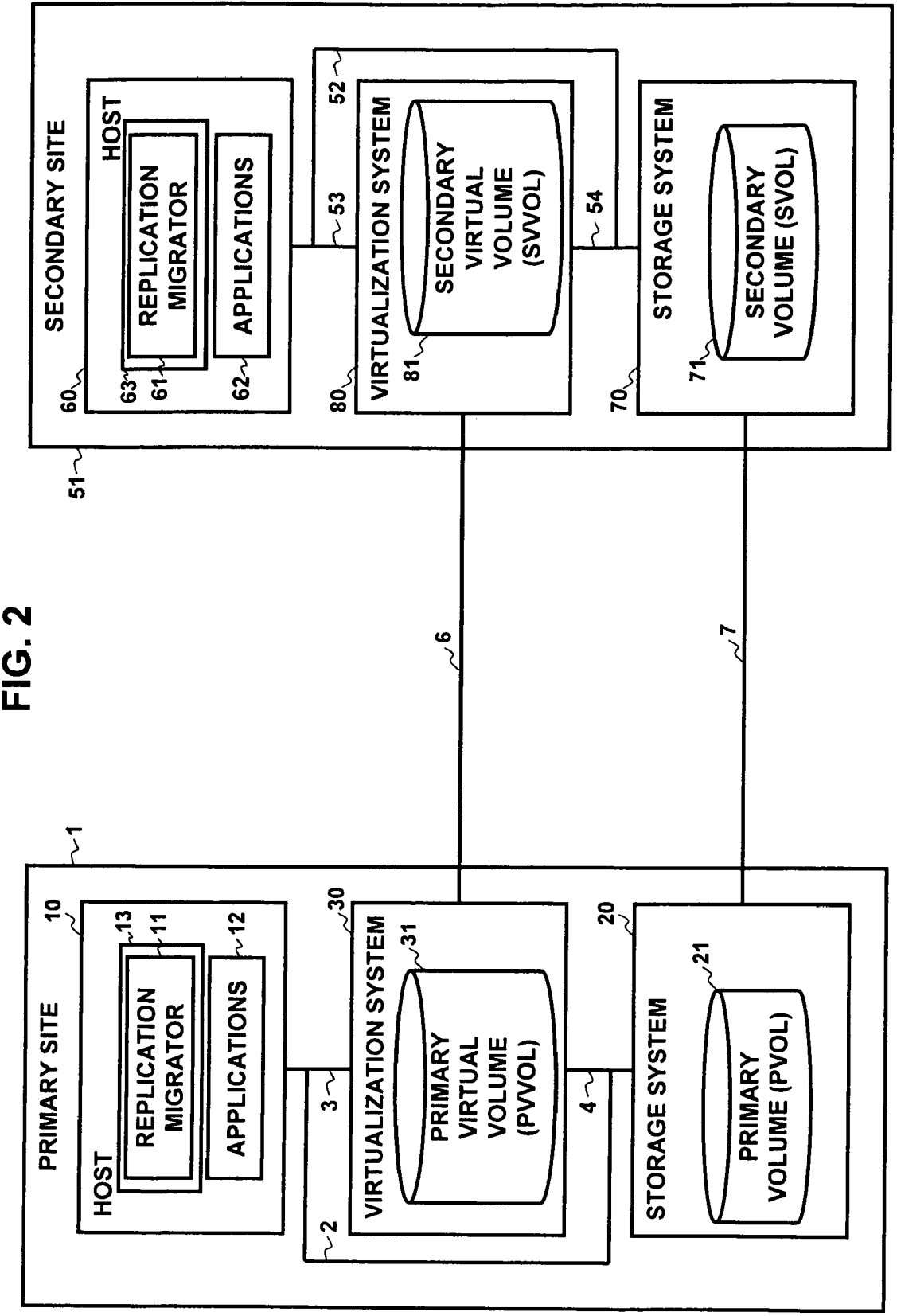
FIG. 2 illustrates an intermediate configuration according to an embodiment of the present invention during implementation of virtualization.
Figure 3:
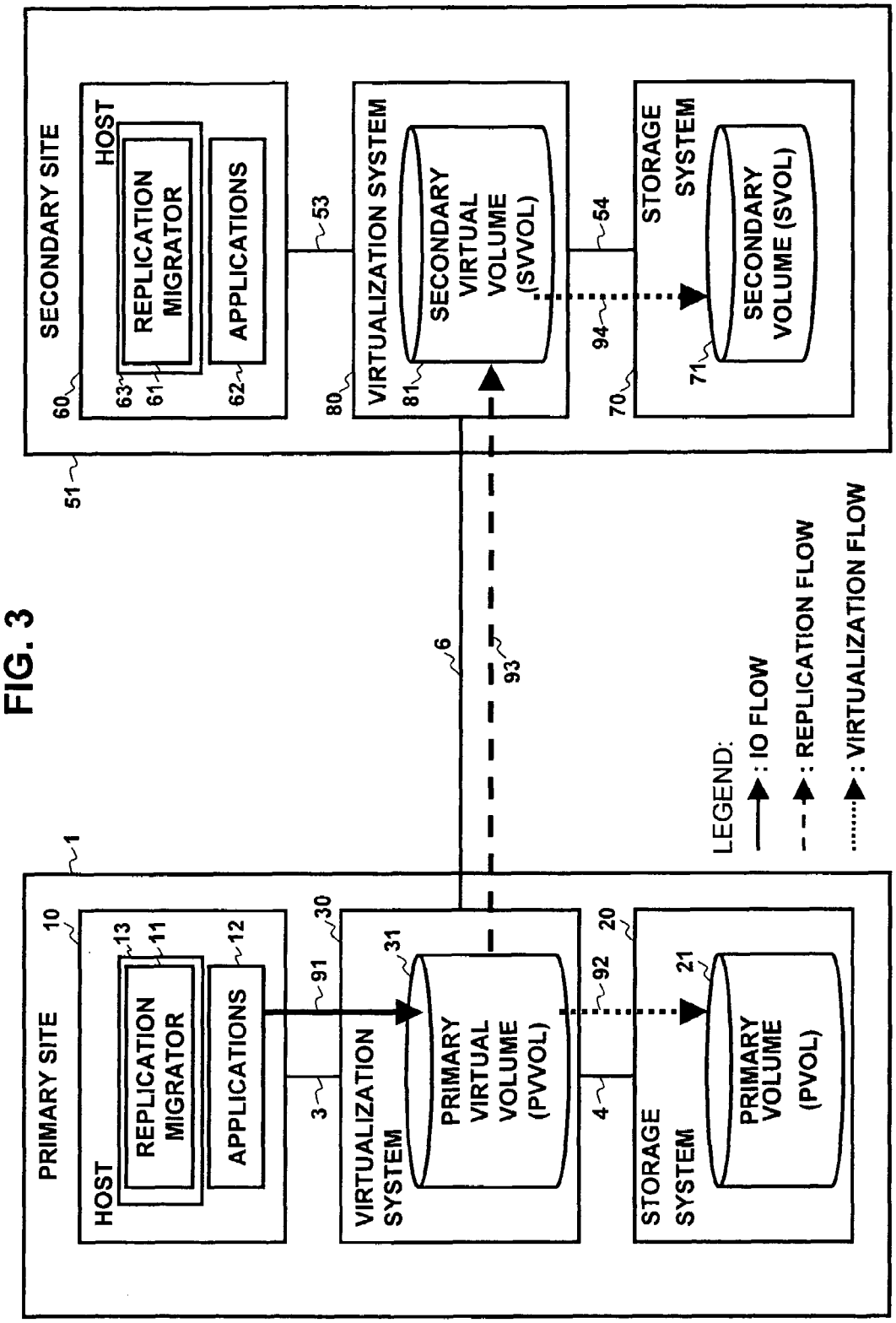
FIG. 3 illustrates a configuration and operation after migrating replication with virtualization fully implemented.

For implementing the virtualization system of the invention, a replication migrator 11 is installed on host 10, and a replication migrator 61 may be installed on host 60. Replication migrator 11, 61 is software that may be defined on a computer-readable medium 13, 63, such as a storage device or memory, either contained within host 10, 60, or in communication with host 10, 60, for execution thereby. FIG. 3 illustrates a system architecture of a remote replication system using the virtualization system of the present invention, while FIG. 2 shows an intermediate configuration between FIG. 1 and FIG. 3. According to FIG. 2, virtualization system 30 is introduced in the primary site 1 and virtualization system 80 is introduced in the secondary site 51. Virtualization system 30 is connected to both the host 10 and the storage system 20 through networks 3 and 4, respectively, which replace network 2 logically. The same preparation should be done within the secondary site 51, with respect to networks 53, 54 logically replacing network 52. Since the virtualization systems 30, 80 exist between the hosts 10, 60 and the storage systems 20, 70, the networks 3, 53 and 4, 54, respectively, should be physically the same type of network as the storage networks 2, 52, respectively, described in connection with FIG. 1. Similarly, a logical network link 6 is established between virtualization system 30 and virtualization system 80, which may use the same physical network as the link 7 described in FIG. 1. Such preparations are related to hardware setup and may be manual operations.

Virtualization system 30 provides one or more virtual volumes to the host 10, so that host 10 logically accesses the virtual volumes. The virtual volumes store mapping information to real volumes, which correspond to data in storage system 20. Every time the virtual volumes receive write data from the host 10, the virtualization system 30 determines the mapping to the real volumes and passes the write data to the real volumes in the storage system 20. In this embodiment, the virtual volume defined as a primary volume of replication is referred to as a primary virtual volume (PVVOL) 31. Similarly, in virtualization system 80, the virtual volume defined as a secondary volume of replication is referred to as secondary virtual volume (SVVOL) 81.

It should be noted that the virtualization system provides replication capability. Each write data to PVVOL 31 is replicated to SVVOL 81 through link 6. As illustrated in FIG. 3, an arrow 91 indicates I/O flow from the host 10 to the virtualization system 30. Arrows 92 and 94 indicate virtualization flow (i.e., mapping flow) from the virtualization systems 30 and 80 to the storage systems 20 and 70, respectively. An arrow 93 indicates remote replication flow from the primary virtualization system 30 to the secondary virtualization system 80.

In one aspect, a purpose of the invention is to provide a method of changing from the architecture shown in FIG. 1 to that shown in FIG. 3. Replication migrators 11 and 61 in the hosts 10 and 60, respectively, are software programs which instruct this migration. The replication migrators 11 and 61 are unique in this embodiment. The programs may be implemented in any program languages and scripting languages. Examples are Java, C, PERL, Basic, REXX (on mainframe), and the like. The method performed by the programs is described in FIGS. 4, 5 and 6 in detail. In another embodiment, the replication migrator 11 may exist separately from the host containing the applications, and may exist in other systems such as a storage management system.

Figure 4:
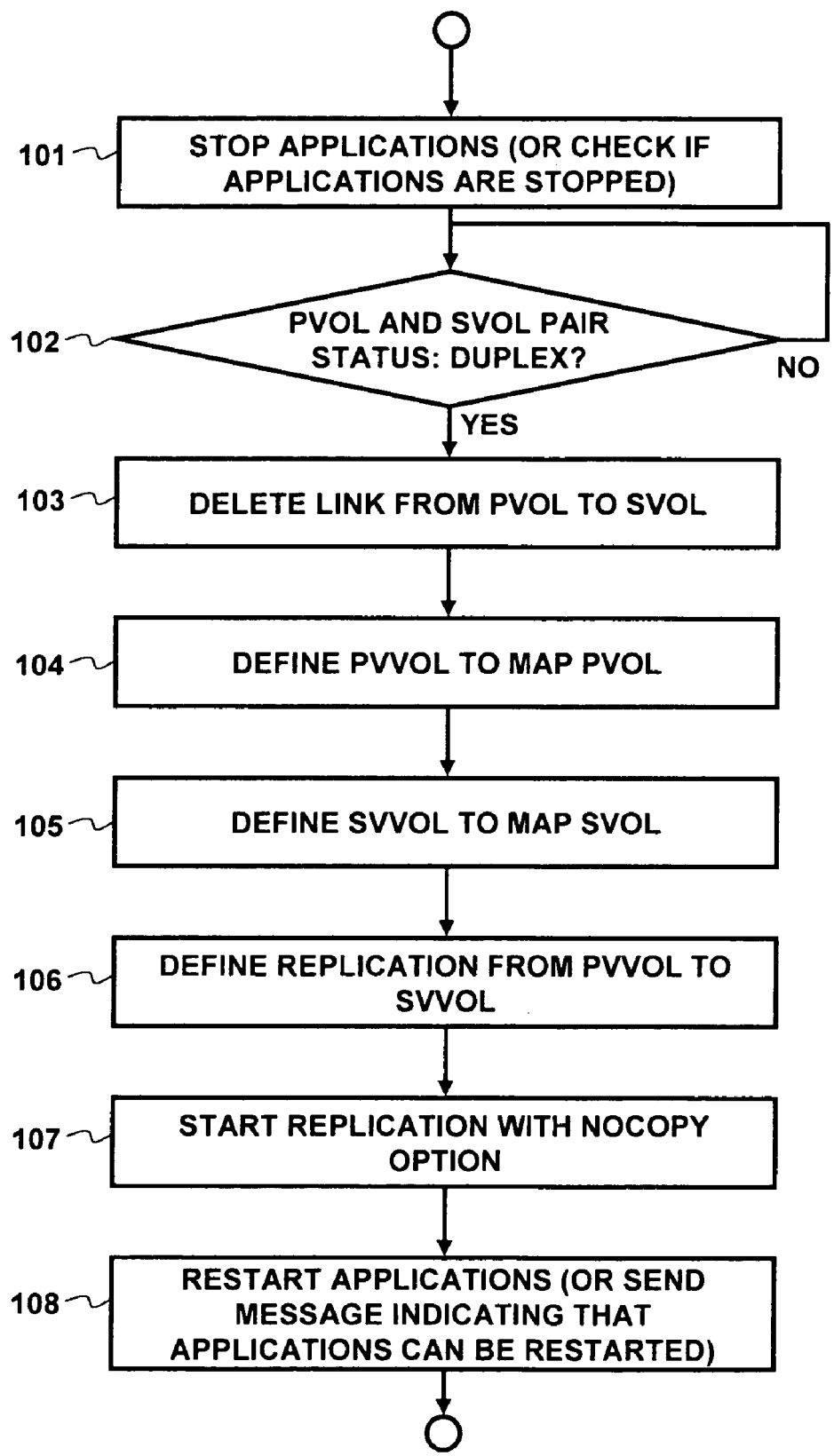
FIG. 4 illustrates a flow chart for migrating replication according to an embodiment of the present invention.

FIG. 4 illustrates the process of migrating replication of the invention. According to this process, PVOL and SVOL are made identical or synchronized. PVVOL and SVVOL are defined to map PVOL and SVOL, respectively. Replication is started from PVVOL to SVVOL while maintaining the data in PVOL and SVOL as they are. There is no real application data migration associated with the process, and as a result, the process does not require the time of migrating replication data. The process uses information of the existing replication configuration to automatically define mapping and replication on the virtualization system, and as a result, the process can minimize migration complexity and cost when migration is required. The steps of FIG. 4 are described in more detail below.

Step 101: The applications are stopped or made sufficiently dormant, such that no data is written by the applications to PVOL 21. This step may be executed manually outside of the Replication Migrator 11. In other embodiments, it is checked whether the applications are stopped or dormant, or the writing of data to PVOL 21 is otherwise restrained. If the applications are not stopped or dormant, then the process sends a message to users indicating that the applications should be stopped or made dormant, and the process waits for the applications to be stopped or made dormant.

Step 102: Because there is no longer update data from the applications, PVOL and SVOL should become identical or eventually arrive at a duplex status. This step checks the replication pair status and waits for the status to arrive at duplex. This checking operation may be realized as commands to the storage system 20 and be used in the Replication Migrator 11.

Step 103: The replication link from PVOL 21 to SVOL 71 will not be used anymore; therefore, the link is deleted. This operation may be realized as commands to the storage system 20 and be used in the Replication Migrator 11.

Step 104: The process automatically defines PVVOL 31 to map PVOL 21.

Step 105: The process automatically defines SVVOL 81 to map SVOL 71. These operations may be realized as commands to the virtualization system 30 and be used in the Replication Migrator 11. Also, the operations are described in more detail in connection with FIGS. 5 and 6 below.

Step 106: The process automatically defines replication from PVVOL to SVVOL. This is described later in connection with FIG. 6. This operation may be realized as commands to the virtualization system 30 and be used in the Replication Migrator 11.

Step 107: The process starts replication with a NOCOPY option. The NOCOPY option itself is well-known technology. With this option, the replication function assumes that PVOL and SVOL are identical, and starts replicating any write data from hosts without any initial copy or update copy before the replication. This step may check the identity of both volumes before starting the replication. This operation may be realized as commands to the virtualization system 30 and be used in the Replication Migrator 11.

Step 108: This step starts the applications again. This step may be executed manually outside of the Replication Migrator 11. In other embodiments, this process sends a message to users indicating that the applications can be restarted. After such operation, any write data will be replicated to SVVOL 81.

The process of defining PVVOL to map to PVOL is illustrated in connection with FIG. 5 as follows:

Step 201: This step checks if the system is ready for automatically defining PVVOL and SVVOL. Before the definition, the system needs to be in the intermediate configuration as illustrated in FIG. 2. The step may check if the virtualization systems are running properly as FIG. 2 shows. If the system is not ready, the process asks users to configure the system as illustrated in FIG. 2.

Step 202: This step collects replication information including PVOL configuration. Usually, the information is collected from replication management software or replication definition files existing on host 10, in storage system 20, or on a management terminal, if such is in place.

Step 203: This step issues a discovery command with the PVOL configuration information as parameters to the virtualization system 30. The PVOL configuration information may consist of storage system identification like machine ID, WWN (World Wide Name) and so on, and volume identification like LUN (Logical Unit Number), LDEV number, and the like. The virtualization system 30 discovers all storage systems and volumes, which are connected to the virtualization system 30, and identifies PVOL using its configuration information. The method of discovering all connected storages and volumes is well known. Examples are shown in the above-referenced U.S. Pat. No. 6,098,129 to Fukuzawa et al., and U.S. Published Patent Application No. 20030221077 to Ohno et al.

Step 204: This step defines PVVOL 31 within the virtualization system 30 to map the PVOL 21. This mapping method is also well known.

Step 205: This step defines an I/O path from the host 10 to the PVVOL 31. The step may use the same functions as used in ordinary virtualization configuration. Some of the unique points in the process shown in FIG. 5 are that the process collects and uses PVOL information to discover PVOL and defines PVVOL to map PVOL, as described in steps 202, 203 and 204.

Figure 5:
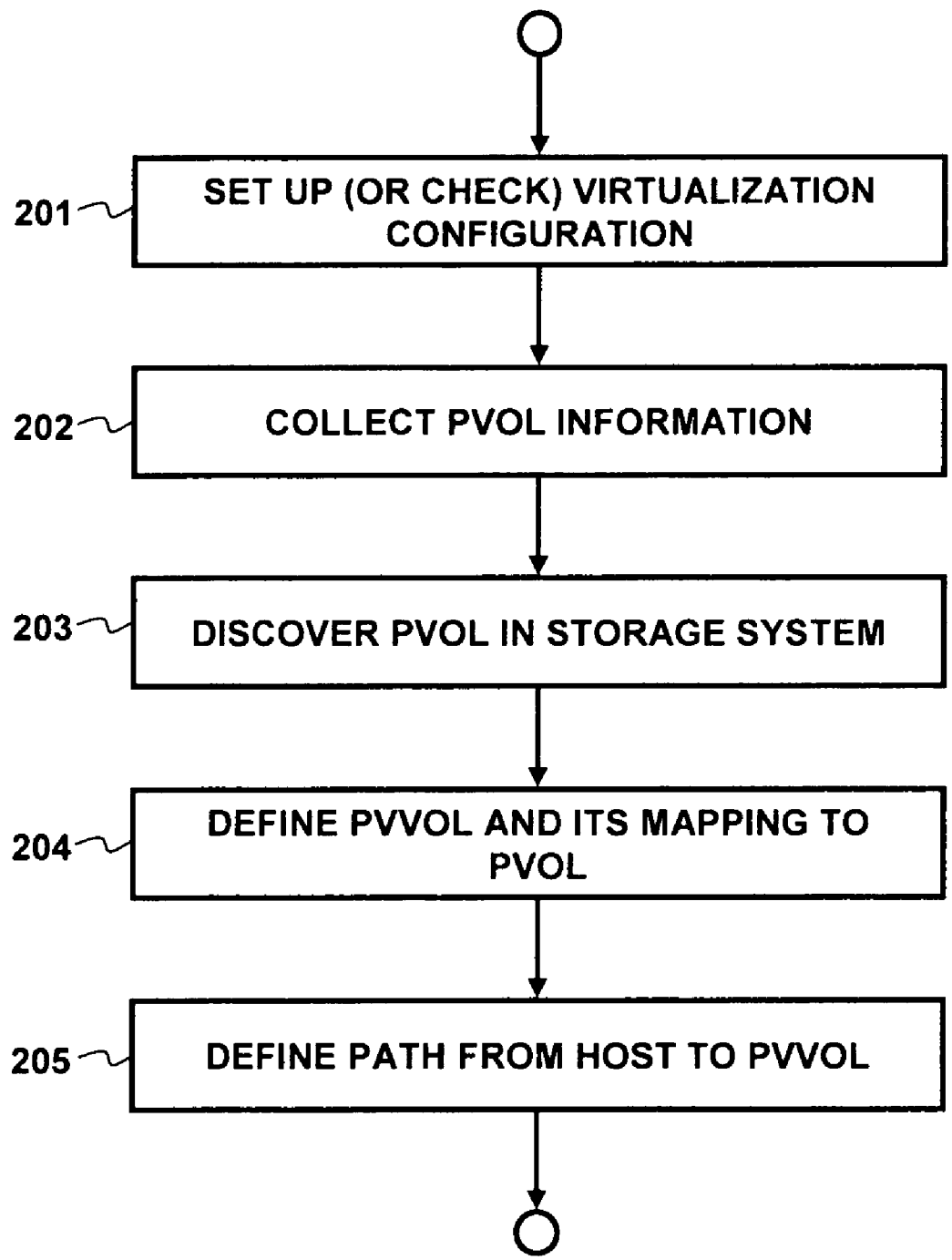
FIG. 5 illustrates a process of mapping PVOL to PVVOL.

The process of defining SVVOL to map SVOL is the same as described in FIG. 5 with respect to PVVOL mapping to PVOL. The process may be executed by the replication migrator 61 in the remote host 60. Preferably, the replication migrator 11 communicates with the replication migrator 61 and delegates the process. The replication migrator 11 may pass the SVOL information to the replication migrator 61. The communication between the hosts may be IP-based such as through a Wide Area Network, but the communication should be secure.

In another embodiment, the replication migrator 11 directly executes the process of defining SVVOL to map to SVOL. In this case, operations are propagated from the virtualization system 30 to the virtualization system 80. In other words, the virtualization system 30 uses remote operations to discover SVOL 71 and define SVVOL 81 to map to SVOL 71.

In yet another embodiment, the replication migrator 11 directly executes the process of defining SVVOL to map SVOL through a communication between the host 10 and the virtualization system 80. The communication may be IP-based such as through a Wide Area Network, but the communication should be secure.

Figure 6:
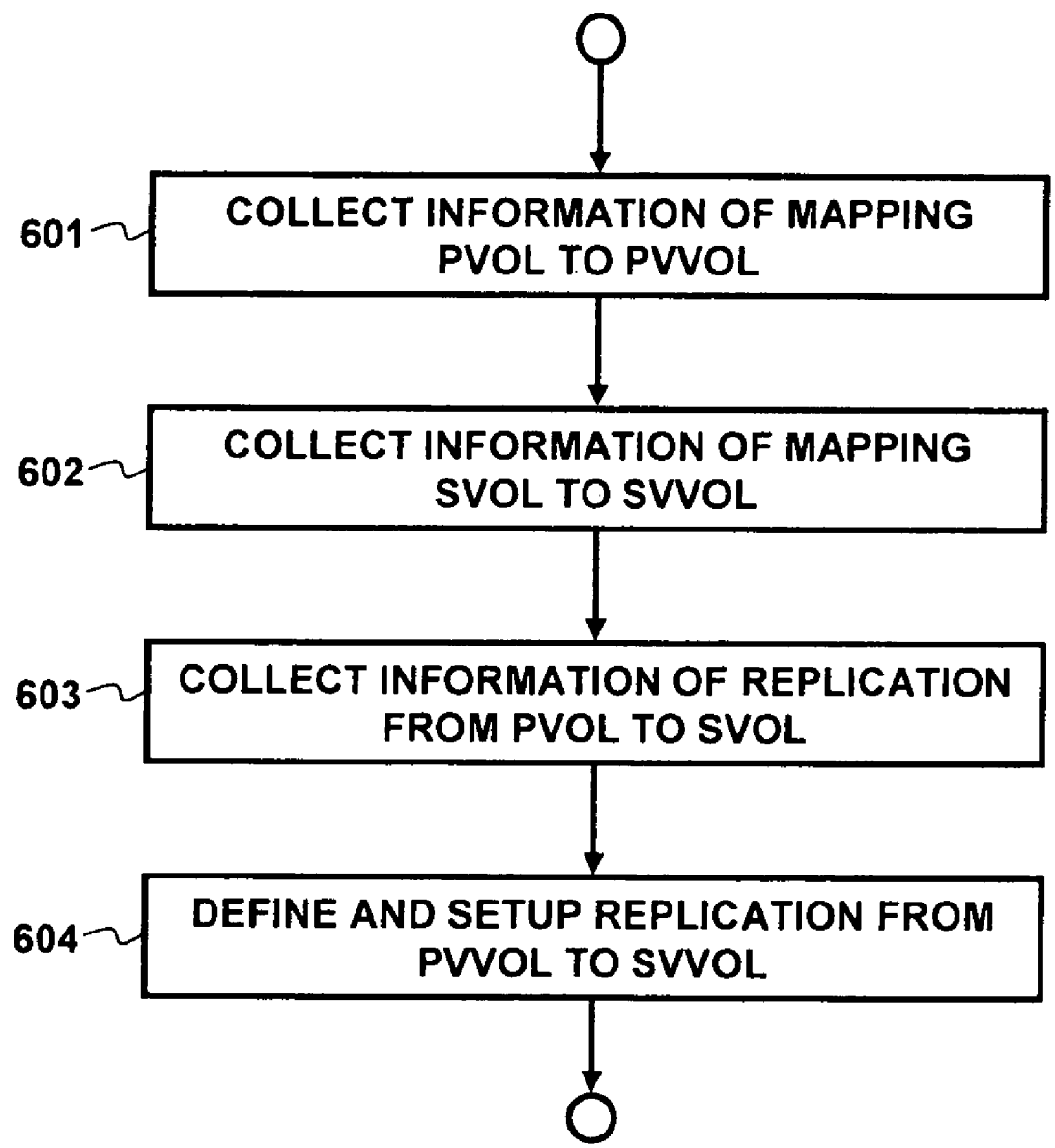
FIG. 6 illustrates a process of defining replication from PVVOL to SVVOL.

The process of defining replication from PVVOL to SVVOL is shown in FIG. 6 and described as follows:

Step 601: In this step, information is collected regarding mapping of PVVOL 31 to PVOL 21.

Step 602: In this step, information is collected regarding mapping of SVVOL 81 to SVOL 71.

Step 603: In this step, information is collected regarding the previous definition of replication from PVOL 21 to SVOL 71.

Step 604: In this step, the replication from PVVOL to SVVOL is defined and set-up. For example, PVVOL is mapped to PVOL and SVVOL is mapped to SVOL, where PVOL was formerly replicated to SVOL. Thus, the process defines that PVVOL will be replicated to SVVOL. The method of defining replication is well known, but the process using the above information is a unique point in this embodiment. Also, the same method may be used to define other replication definitions, such as for HA (High Availability) software configurations.

Second Embodiment

Migrating In-System Replication

Figure 7:
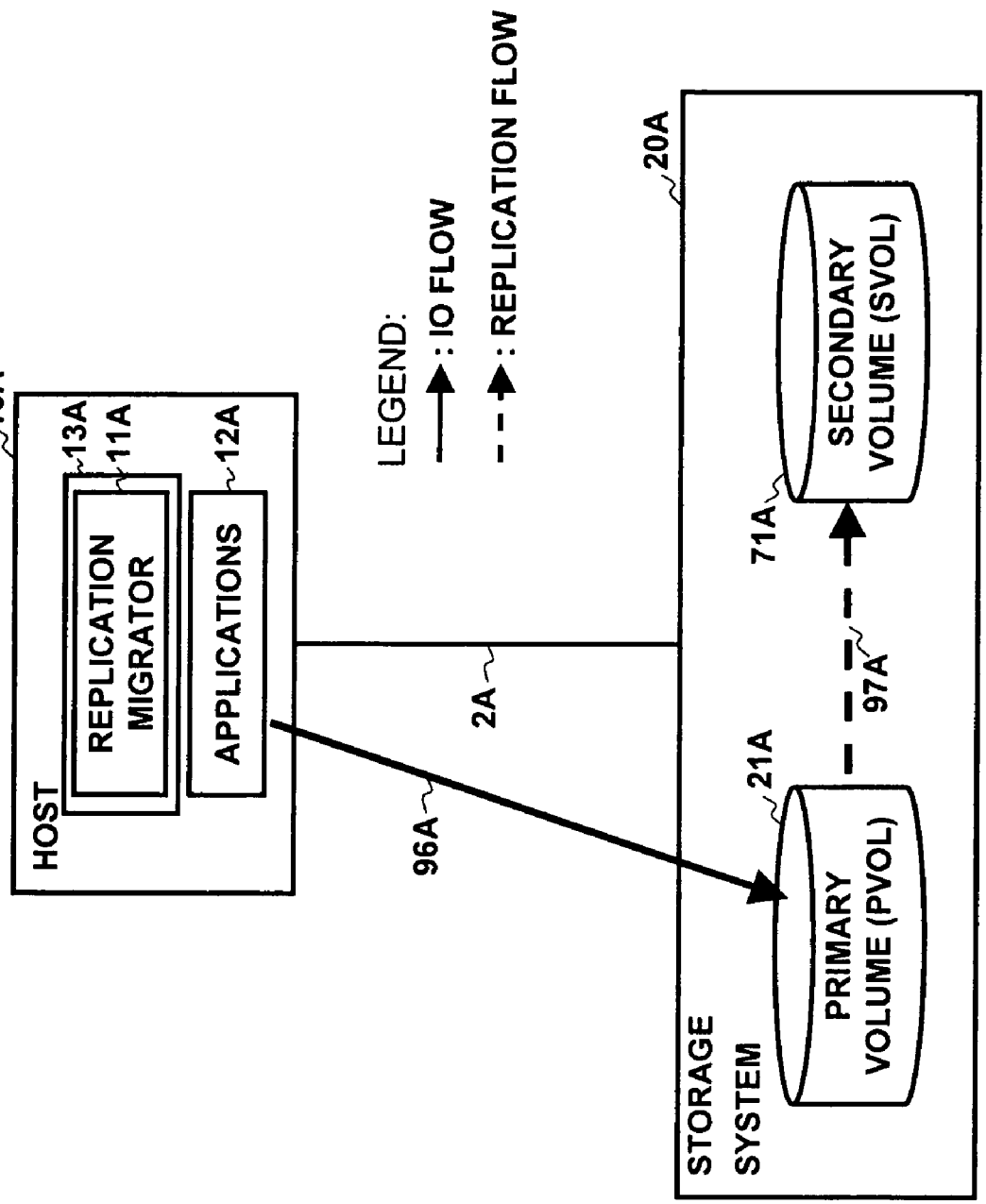
FIG. 7 illustrates a configuration and operation before migrating to virtualized in-system replication.

FIG. 7 shows a system architecture of an in-system replication system to which the present invention is applied, prior to implementation of virtualization. A host 10A includes applications 12A. Also, a replication migrator 11A on a computer-readable medium 13A may be installed to the host 10A before the migration is executed. Host 10A is in communication with a storage system 20A via a network 2A, whereby write data is written, as indicated by arrow 96A, to a primary volume (PVOL) 21A on storage system 20A by applications 12A. Write data to PVOL 21A is replicated to in-system replica secondary volume (SVOL) 71A. An arrow 97A indicates the in-system replication. Other components are the same as the components described above with reference to FIG. 1.

Figure 8:
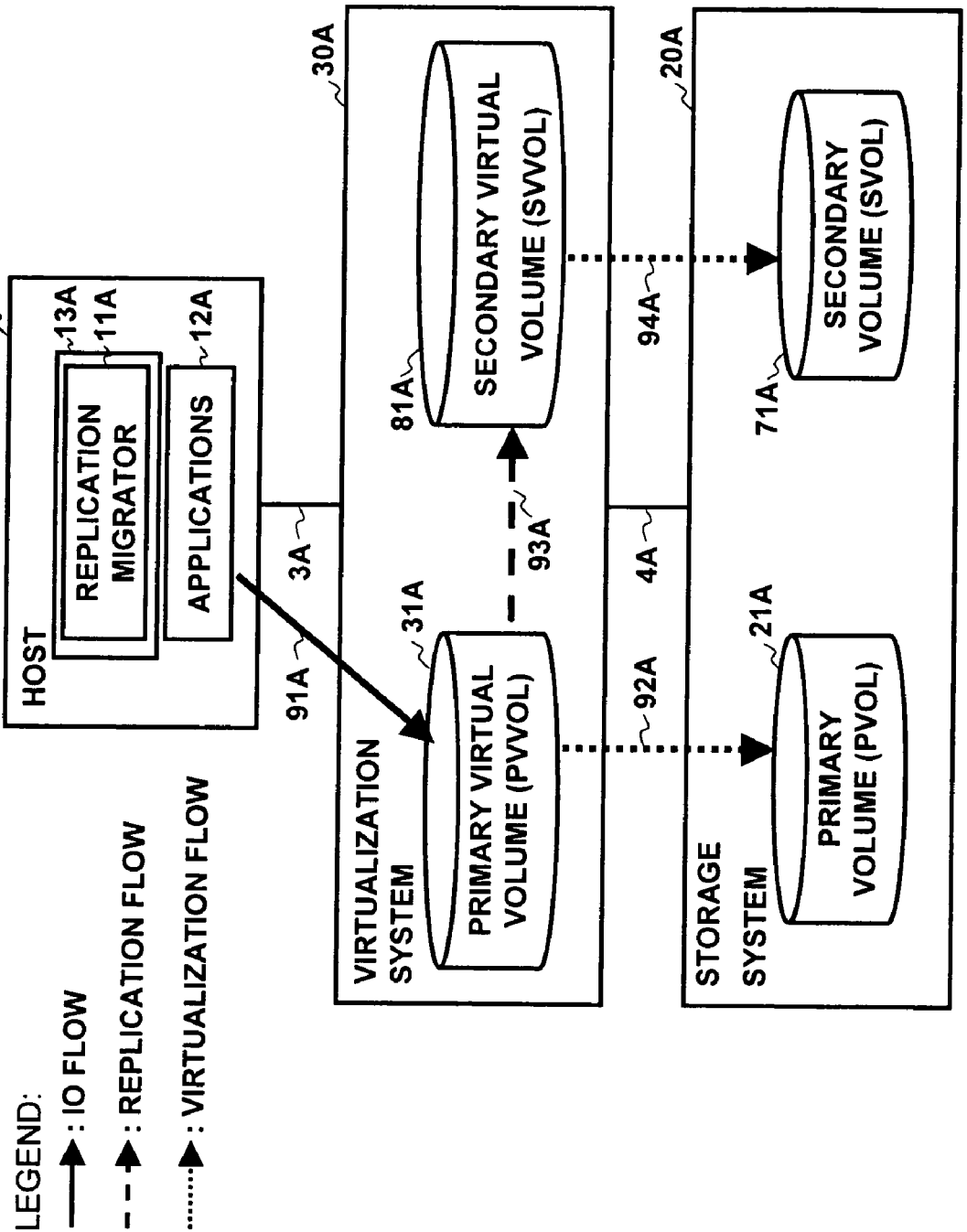
FIG. 8 illustrates a configuration and operation after migrating to virtualized in-system replication.

FIG. 8 shows a system architecture of an in-system replication system using virtualization in accordance with the present invention. Virtualization system 30A is introduced between host 10A and storage system 30A in a manner described above with reference to the first embodiment. Write data to PVVOL 31A are replicated to SVVOL 81A using in-system replication, as indicated by arrow 93A. The write data are written into the PVOL 21A that is mapped by PVVOL 31A. Also, the replicated data are written into the SVOL 71A that is mapped by SVVOL 81A. PVOL 21A and SVOL 71A still exist in the same storage system 20A. Also, PVVOL 31A and SVVOL 81A exist in the same virtualization system 30A. The process of migrating virtualized in-system replication, i.e., changing the system architecture from the configuration of FIG. 7 to that FIG. 8 is carried out in the same manner as the process described in FIGS. 4, 5 and 6.

Third Embodiment

Migrating In-System Replication

Figure 9:
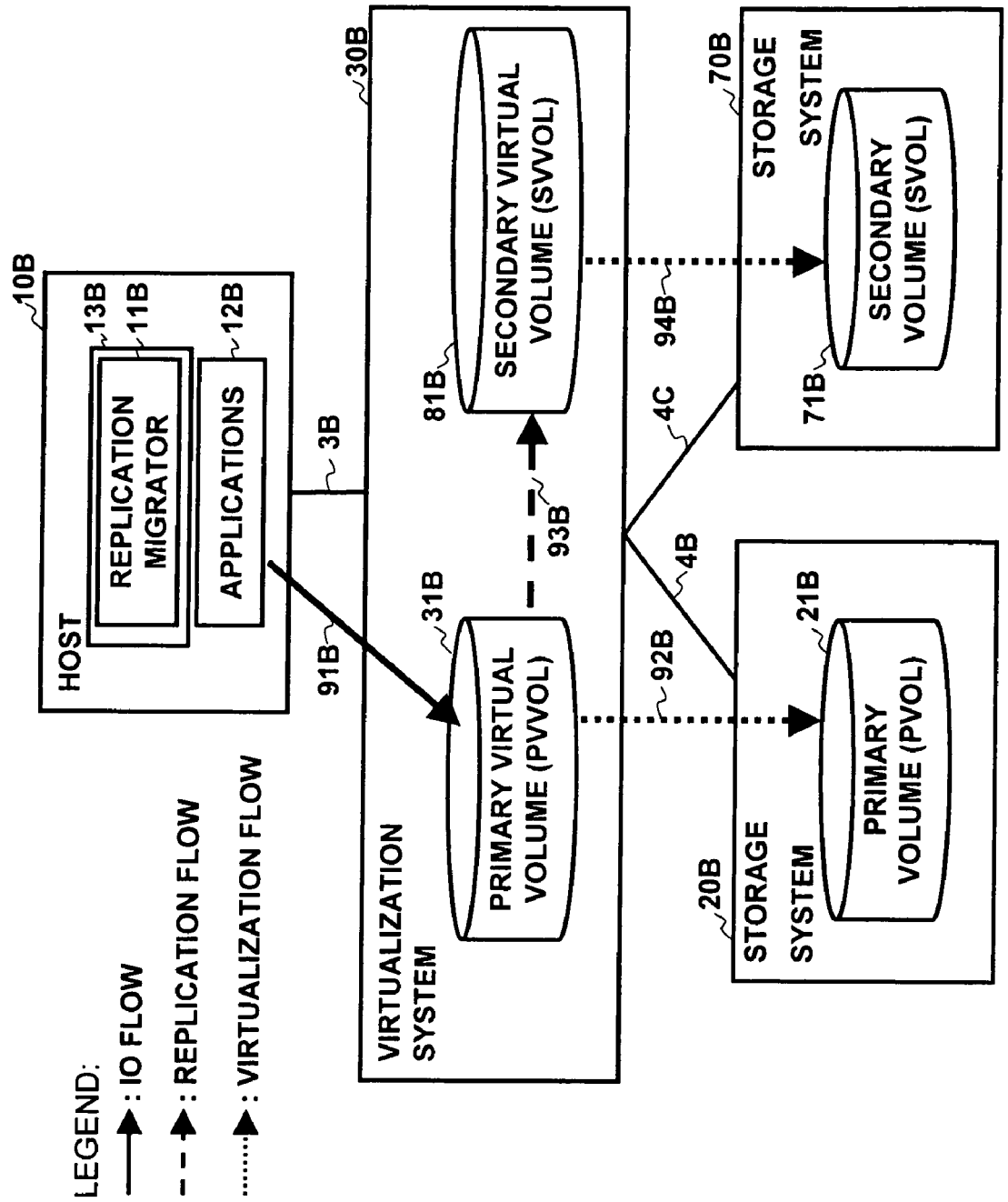
FIG. 9 illustrates a configuration and operation after migrating remote replication to virtualized in-system replication.

The system configuration of FIG. 1, in which remote replication is utilized, can be also be reconfigured to incorporate virtualization in an architecture as set forth in FIG. 9, in which in-system replication is utilized in the virtualization portion of the system, rather than remote replication, as shown in FIG. 3. The architecture of FIG. 9 includes a host 10B having a replication migrator 11b on a computer-readable medium 13B, and applications 12B. In FIG. 9, write data to the PVVOL 31B are replicated to SVVOL 81B using in-system replication, as indicated by arrow 93B. The write data is written into the PVOL 21B that is mapped by PVVOL 31B. Also, the replicated data are written into the SVOL 71B that is mapped by SVVOL 81B. PVOL 21B exists in the storage system 20B, and SVOL 71B exists in a separate storage system 70B, which may be remote from storage system 20B and host 10B. However, PVVOL 31B and SVVOL 81B are in the same virtualization system 30B, with SVVOL 81B mapping to remote SVOL 71B. Thus, in FIG. 9, the host 10B, the virtualization system 30B, and the storage system 20B may all exist in the same site, but the storage system 70B may exist at a different site. Therefore, the storage network 4C may physically be a long distance network connection, such as that described above with reference to network connection 7, while network 4B may be short distance.

Figure 10:
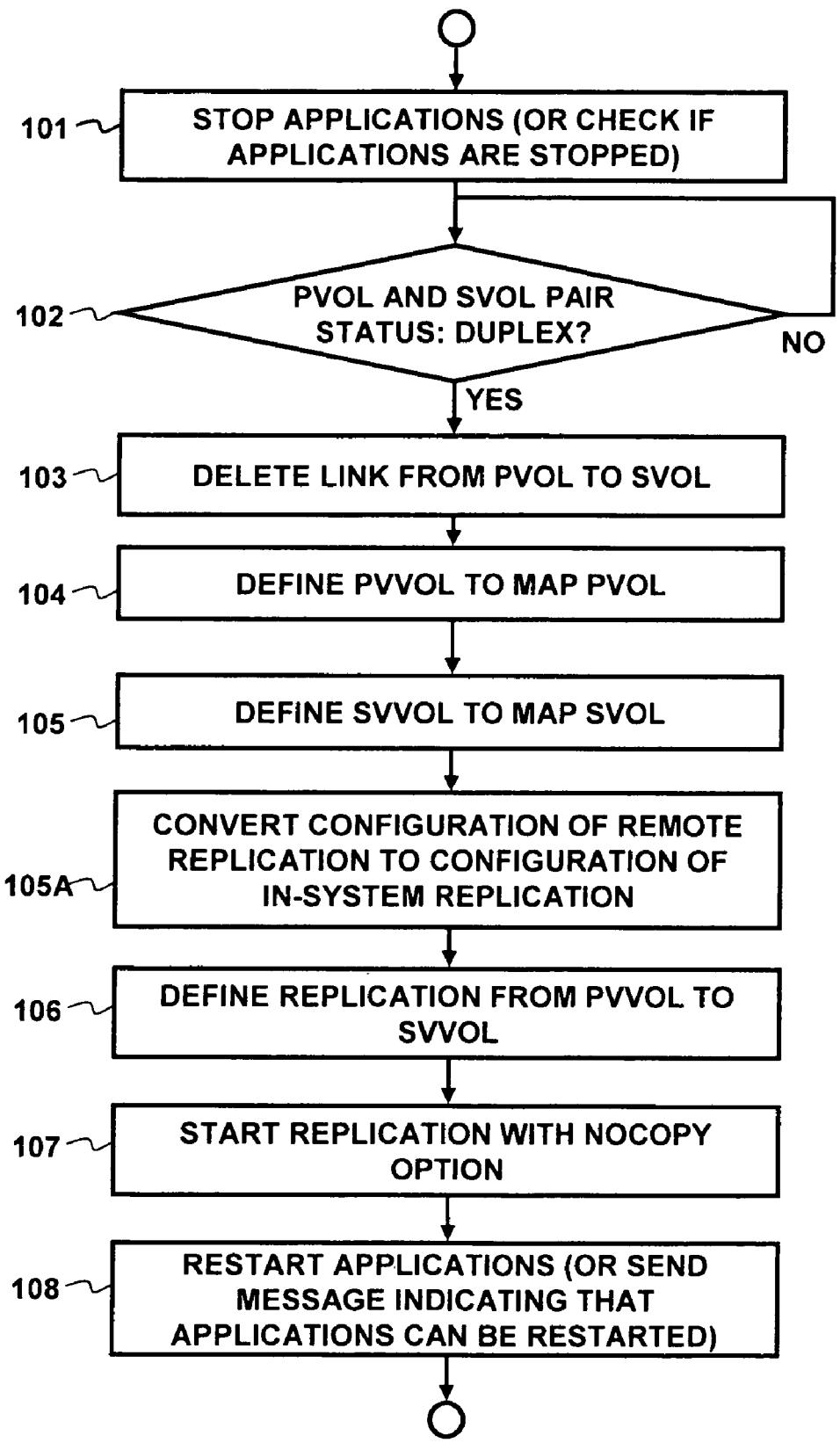
FIG. 10 illustrates a flow chart for migrating replication according an in-system embodiment of the present invention.

As illustrated in FIG. 10, the process of changing a system configuration from that of FIG. 1 to that of FIG. 9 under the invention is almost the same as the process described in FIGS. 4, 5 and 6, except that step 105A is included before the step 106:

Step 105A: Convert configuration of remote replication to configuration of in-system replication. In general, configurations of both remote replication and in-system replication are different. Examples of the difference are command, parameters and any other syntax. Within the step, predefined conversion rules convert configuration of remote replication to configuration of in-system replication. However, the concept of a volume pair is the same among both remote replication and in-system replication. Therefore, step 106 should be the same as in the first embodiment except converting some syntax. The other steps of the process are the same as those described above with respect to FIG. 4, and thus, will not be described again here.

Fourth Embodiment

Updating Virtualization System

This embodiment is related to the cases in which both of the virtualization systems 30 and 80 are replaced with new virtualization systems, or in which either of the virtualization systems 30 or 80 is replaced with a new virtualization system. In the former case, hardware replacement may be done between step 103 and step 104 of FIG. 4. In this embodiment, configurations and operations both before migrating replication and after migrating replication are the same as described above with respect to FIG. 3, except changing PVOL to PVVOL and SVOL to SVVOL in Steps 102 and 103. For the later case, Step 104 or 105 is omitted depending on which virtualization system is replaced.

Fifth Embodiment

Figure 11:
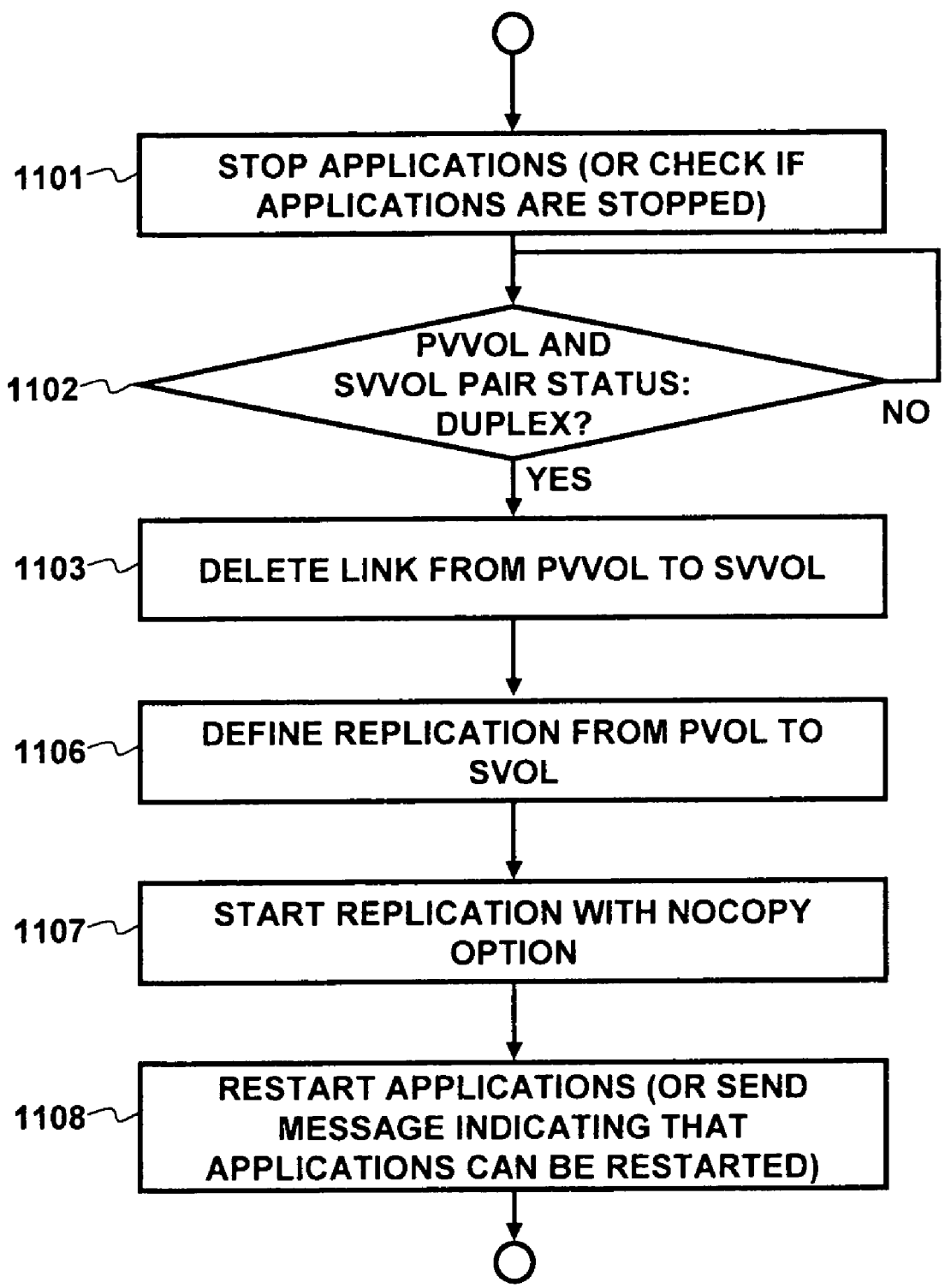
FIG. 11 illustrates a flow chart for migrating from replication using virtualization back to ordinary replication.

Migrating from Replication Using Virtualization Back to Ordinary Replication In this embodiment, configuration and operation before migrating replication is FIG. 3 or 9 and configuration and operation after migrating replication is FIG. 1. The process of migrating to non-virtualized replication is similar to FIG. 4, but with some significant differences, as set forth in FIG. 11, as follows:

Step 1101: The applications are stopped or made dormant, so that no data is written by the applications to PVOL. This step may be executed manually outside of the Replication Migrator. In other embodiments, it is checked whether the applications are stopped or dormant. If the applications are not stopped or dormant, then the process sends a message to users indicating that the applications should be stopped or made dormant, and the process waits for the applications to be stopped or made dormant.

Step 1102: Because there is no longer update data from the applications, PVVOL and SVVOL should become identical or eventually arrive at a duplex status. This step checks the replication pair status and waits for the status to arrive at duplex. This checking operation may be realized as commands to the storage system 20 and be used in the Replication Migrator 11.

Step 1103: The replication link from PVVOL to SVVOL will not be used anymore; therefore, the link is deleted. This operation may be realized as commands to the storage system 20 and be used in the Replication Migrator 11.

Step 1106: The process automatically defines replication from PVOL to SVOL. This is described later in connection with FIG. 12. This operation may be realized as commands to the storage system 20 and be used in the Replication Migrator 11.

Step 1107: The process starts replication with a NOCOPY option. This step may check the identity of both volumes before starting the replication. This operation may be realized as commands to the storage system 20 and be used in the Replication Migrator 11.

Step 1108: This step starts the applications again. This step may be executed manually outside of the Replication Migrator. In other embodiments, this process sends a message to users indicating that the applications can be restarted. After such operation, any write data will be written directly to PVOL and replicated to SVOL.

Figure 12:
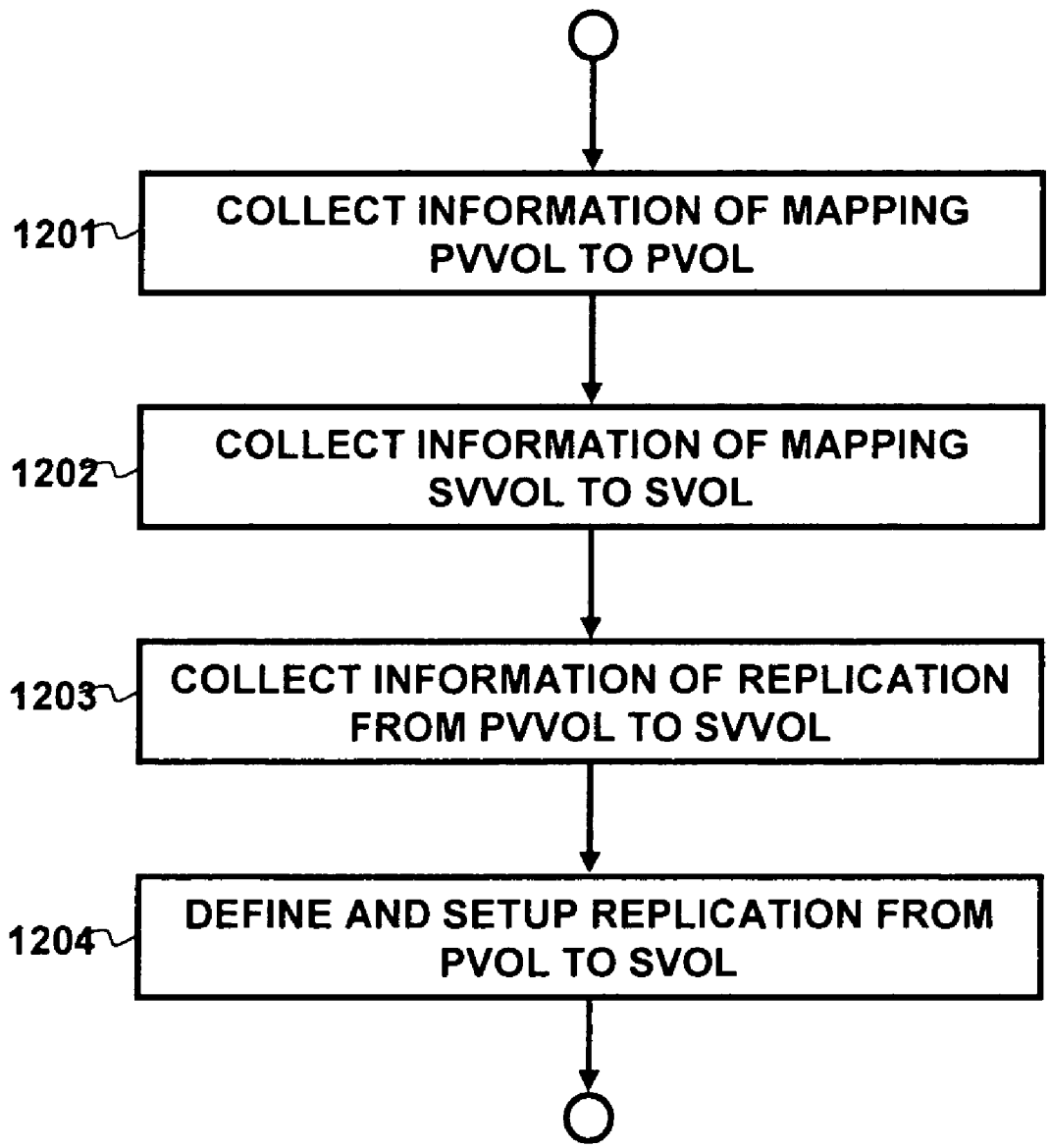
FIG. 12 illustrates a flow chart for defining replication from PVOL to SVOL when migrating from replication using virtualization back to ordinary replication.

Also, within FIG. 12, the following modifications are made over FIG. 6 for redefining replication from PVOL to SVOL:

Step 1201: In this step, information is collected regarding mapping of PVVOL 31 to PVOL 21.

Step 1202: In this step, information is collected regarding mapping of SVVOL 81 to SVOL 71.

Step 1203: In this step, information is collected regarding replication from PVVOL to SVVOL.

Step 1204: In this step, the replication from PVOL to SVOL is defined and set-up. The mappings are 1-to-1, so the process is automatically executable.

Returning the configuration of FIG. 8 back to that of FIG. 7, and the configuration of FIG. 9 back to that of FIG. 1 is accomplished in the same manner as set forth above.

Some alternative embodiments of the invention might be considered special cases. For example, there may exist a case in which multiple hosts are connected to a storage system in the primary site and the secondary site, respectively. In this embodiment, only one host in the site contains the replication migrator, which controls all applications in the hosts that access to the storage system and executes step 101 and 108, set forth in FIG. 4 above. The replication migrator may communicate with applications in other hosts through a LAN (Local Area Network) in the site, or the like. Additionally, an embodiment may exist wherein a site contains multiple storages, and the storages work separately from each other.

Furthermore, a system may include multiple replications, such that one write data is replicated to multiple target volumes. The technology is available for not only in-system replication but also remote replication. In case of multiple replications, each step related to replication in FIGS. 4, 5 and 6 needs to be aware of the number of replications. For example, step 102 checks pair status of each replication, rather than for a single replication.

Furthermore, the virtualization system may be included in the storage system internally. For example, storage system 20 is combined into virtualization system 30 in FIG. 3, or storage system 70 is combined into virtualization system 80.

As will be apparent to those skilled in the art, because initial copy is eliminated, the method can shorten the time of migrating replication. In general, initial copy is required when a replication system is migrated to a new environment. Typically, it takes much time for the initial copy because all data in PVOL needs to be copied to SVOL. Also, data is not protected at SVOL during the initial copy because all data is not yet copied to the SVOL. According to the invention, replication is started with a NOCOPY option, and does not require any initial copy. As a result, the time required for migrating replication can be shortened, as well as shortening the time period during which the data is not protected. Further if users normally are required to stop applications during the initial copy, the downtime caused by the migration can also be shortened.

Additionally, under the invention, the costs associated with migration can be reduced. Generally speaking, migration requires a lot of preparation and development, because the migration method can differ depending on each environment. On the other hand, the present invention focuses attention on consistent information, i.e., information of the existing replication configuration, and uses it to define PVVOL, SVVOL, and the replication configuration between PVVOL and SVVOL. In other words, the system and method of the invention automates creating PVVOL definition, SVVOL definition, replication configuration, and even replication scripts if necessary. As a result, the present invention can minimize the complexity associated with the migration of replication and its cost.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

The invention claimed is:

1. A method of migrating replication using virtualization performed by a program residing on a host computer, said host being in communication with one or more storage systems, wherein a primary volume (PVOL) and a secondary volume (SVOL), which is a target of replication of the PVOL, exist on said one or more storage systems, said method comprising the steps of:

restraining write operations from any applications to the PVOL;

determining whether the PVOL and the SVOL are synchronized, and if so, deleting a link from the PVOL to the SVOL;

defining a primary virtual volume (PVVOL) to map to the PVOL and defining a secondary virtual volume (SVVOL) to map to the SVOL;

establishing a new replication pair between the PVVOL and the SVVOL;

commencing replication between the PVVOL and the SVVOL with a NOCOPY option; and enabling the applications to be restarted.

2. The method according to claim 1, wherein said step of commencing replication with a NOCOPY option includes the step of replicating any write data from the host without any initial copy or update copy before the commencing of the replication.

3. The method according to claim 1, wherein the PVVOL and the SVVOL are part of a virtualization system, said method further including the step of:

using information of an existing replication configuration to automatically define mapping and replication on the virtualization system.

4. The method according to claim 1, wherein the step of defining the PVVOL to map to the PVOL and defining the SVVOL to map to the SVOL includes the steps of:

collecting PVOL information and SVOL information;

discovering the PVOL and the SVOL in the one or more storage systems using the collected PVOL and SVOL information, respectively; and defining the PVVOL and its mapping to the PVOL, and defining the SVVOL and its mapping to the SVOL.

5. The method of claim 4, further including the step of using remote operations to discover the SVOL and to define the SVVOL to map to the SVOL.

6. The method according to claim 1, further including the step of eliminating a time period associated with data migration, by migrating no application data during the migration of replication.

7. The method according to claim 1, wherein there are two said storage systems, and wherein said step of defining the PVVOL to map to the PVOL and defining the SVVOL to map to the SVOL includes:

defining the PVVOL to map to the PVOL, wherein the PVOL exists on said first storage system, and defining the SVVOL to map to the SVOL, wherein the SVOL exists on said second storage system.

8. A method using virtualization for migrating replication, wherein data on a primary volume (PVOL) in a first storage system is replicated through a replication link to a secondary volume (SVOL) located in either the first storage system or in a second storage system, said method comprising the steps of:

preventing writing of data by a host to the PVOL;

determining whether the PVOL and the SVOL are identical;

deleting the replication link from the PVOL to the SVOL if the result of the determination is that the PVOL and the SVOL are identical;

defining a primary virtual volume (PVVOL) to map to the PVOL and defining a secondary virtual volume (SVVOL) to map to the SVOL;

establishing a new replication pair between the PVVOL and the SVVOL;

commencing replication between the PVVOL and the SVVOL; and sending a message for restarting the writing of data to the PVVOL in place of the PVOL.

9. The method according to claim 8, wherein said step of commencing replication includes the step of commencing replication with a NOCOPY option whereby any write data from the host is replicated without any initial copy or update copy before the commencing of the replication.

10. The method according to claim 8, further including the step of:

providing a replication migrator on the host, wherein said replication migrator establishes a virtualization system between the host and the first storage system.

11. The method according to claim 8, further including the step of:

providing a replication migrator executable by the host, wherein said replication migrator defines a virtualization system between the host and the first storage system, and wherein said virtualization system includes the PVVOL.

12. The method according to claim 8, further including the step of:

providing a primary site and a secondary site, said primary site having said host and said first storage system and said secondary site having a second host and said second storage system, with the SVOL existing on said second storage system, wherein said host includes a first replication migrator that defines a first virtualization system between the host and the storage system, said first virtualization system including the PVVOL; and wherein said second host includes a second replication migrator that defines a second virtualization system between the second host and the second storage system, said second virtualization system including the SVVOL.

13. The method according to claim 8, further including the step of:

providing a primary site and a secondary site, said primary site having said host and said first storage system and said secondary site having said second storage system, with the SVOL being on said second storage system, wherein said host includes a replication migrator that defines a virtualization system between the host and the first storage system and the second storage system, said virtualization system including the PVVOL and the SVVOL.

14. The method according to claim 8, wherein the step of defining the PVVOL to map to the PVOL and defining the SVVOL to map to the SVOL includes the steps of:

collecting PVOL information and SVOL information;

discovering the PVOL and the SVOL in the storage systems using the collected PVOL and SVOL information, respectively; and defining the PVVOL and its mapping to the PVOL, and defining the SVVOL and its mapping to the SVOL.

15. The method of claim 14, further including the step of using remote operations to discover the SVOL and to define the SVVOL to map to the SVOL.

16. A storage replication system with virtualization comprising:

a primary site having a first host and a first storage system, said first storage system including a primary volume;

a secondary site having a second storage system, with a secondary volume located on the second storage system, said secondary volume storing replication data from said primary site, whereby the secondary volume mirrors the primary volume; and a virtualization system that provides:

a primary virtual volume accessible by the first host so that the first host can logically access the primary virtual volume, the primary virtual volume mapping to said primary volume;

a secondary virtual volume mapping to said secondary volume, whereby data stored to said primary virtual volume is stored to said primary volume and automatically replicated to the secondary virtual volume for storing on said secondary volume.

17. The storage replication system according to claim 16, wherein the first host comprises a replication migrator for establishing the virtualization system between the first host and first and second storage systems.

18. The storage replication system according to claim 16, further comprising a second host located at said secondary site, wherein said virtualization system includes first and second virtualization systems, said first virtualization system including said primary virtual volume and being configured at said primary site, and said second virtualization system including said secondary virtual volume and being configured at said secondary site.

19. The storage replication system according to claim 18, further comprising a first replication migrator on said first host for establishing said first virtualization system, and a second replication migrator on said second host for establishing said second virtualization system.

20. The system according to claim 16, wherein the virtualization system sets the primary virtual volume to map to the primary volume and sets the secondary virtual volume to map to the secondary volume by:

collecting primary volume information and secondary volume information;

discovering the primary volume and the secondary volume in the storage systems using the collected primary volume information and secondary information, respectively; and defining the primary virtual volume and its mapping to the primary volume, and defining the secondary virtual volume and its mapping to the secondary volume.

* * * * *